(12) United States Patent
Kim et al.

(10) Patent No.: US 10,893,341 B2
(45) Date of Patent: Jan. 12, 2021

(54) DATA TRANSMISSION DEVICE, NON-TRANSITORY COMPUTER READABLE MEDIUM, AND DATA RECEPTION DEVICE

(71) Applicant: KABUSHIKI KAISHA TOSHIBA, Minato-ku (JP)

(72) Inventors: Suh Wuk Kim, Kawasaki (JP); Hiroki Kudo, Kawasaki (JP); Sakie Nagakubo, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/278,762

(22) Filed: Feb. 19, 2019

(65) Prior Publication Data

US 2020/0092619 A1 Mar. 19, 2020

(30) Foreign Application Priority Data

Sep. 18, 2018 (JP) .................................. 2018-174025

(51) Int. Cl.
   - *H04B 17/00* (2015.01)
   - *H04Q 9/02* (2006.01)
   - *H04W 84/18* (2009.01)

(52) U.S. Cl.
   CPC ............ *H04Q 9/02* (2013.01); *H04Q 2209/40* (2013.01); *H04Q 2209/826* (2013.01); *H04W 84/18* (2013.01)

(58) Field of Classification Search
   CPC ..... H04W 84/18; H04Q 9/02; H04Q 2209/40; H04Q 2209/826
   USPC ..................................................... 455/67.11
   See application file for complete search history.

(56) References Cited

U.S. PATENT DOCUMENTS

| | | | | |
|---|---|---|---|---|
| 7,788,440 B2* | 8/2010 | Weichhold | .......... | H04L 12/4625 710/311 |
| 10,772,518 B2* | 9/2020 | Pernu | ................... | G01C 22/006 |
| 2012/0251104 A1* | 10/2012 | Oberland | ......... | H04B 10/50575 398/38 |
| 2015/0285834 A1* | 10/2015 | Shibuya | .............. | G01P 15/0802 702/150 |

(Continued)

FOREIGN PATENT DOCUMENTS

| | | |
|---|---|---|
| JP | 2016-067409 | 5/2016 |
| JP | 2017-009663 | 1/2017 |

*Primary Examiner* — April G Gonzales
(74) *Attorney, Agent, or Firm* — Oblon, McClelland, Maier & Neustadt, L.L.P.

(57) ABSTRACT

According to one embodiment, a data transmission device, includes: a wireless transmitting circuitry transmitting a wireless signal; measurement circuitry measuring a state of a measurement target at a first sampling rate and acquiring a first measurement value of the state of the measurement target; and controlling circuitry determining whether the first measurement value satisfies a first condition based on a first threshold value. The wireless transmitting circuitry transmits the plurality of first measurement values acquired before the first condition is satisfied when the first condition is satisfied. The measurement circuitry switches the first sampling rate to a second sampling rate higher than the first sampling rate when the first condition is satisfied, measures a state of the measurement target at the second sampling rate, and acquires a second measurement value of the state of the measurement target. The wireless transmitting circuitry transmits the second measurement value.

7 Claims, 10 Drawing Sheets

(56) References Cited

U.S. PATENT DOCUMENTS

| | | | |
|---|---|---|---|
| 2016/0089566 A1* | 3/2016 | Mitsunaga | G01P 1/00 |
| | | | 702/150 |
| 2017/0189752 A1* | 7/2017 | Mohrman | A61B 5/7271 |
| 2018/0167649 A1* | 6/2018 | Hayakawa | H04N 9/802 |
| 2018/0168462 A1* | 6/2018 | Pernu | G01P 15/0802 |

* cited by examiner

DATA TRANSMISSION DEVICE, NON-TRANSITORY COMPUTER READABLE MEDIUM, AND DATA RECEPTION DEVICE

CROSS-REFERENCE TO RELATED APPLICATIONS

This application is based upon and claims the benefit of priority from Japanese Patent Application No. 2018-174025 filed on Sep. 18, 2018; the entire contents of which are incorporated herein by reference.

FIELD

Embodiments described herein relate to a data transmission device, data transmission method, computer program, data transmission system, and data reception device.

BACKGROUND

Nowadays, due to advances in sensor network technology, there are growing needs to measure a state of an object desired to be monitored (measurement target), such as vibration of or sound emitted by the measurement target, analyze measured data, and thereby detect abnormality and predict failure of the measurement target. For example, a sensor device measures vibration of a motor, vibration of a bridge, vibration of an airplane, or the like, and then transmits measured data to an analysis device, which in turn predicts failure.

However, if all the measurement data on the measurement target is acquired, an amount of the data becomes huge. Therefore, a method is also conceivable that does not transmit data to the analysis device before the data exceeds a threshold value, but transmits data after its amplitude becomes equal to or greater than the threshold value. However, this method cannot obtain data before the threshold value is exceeded. Therefore, it is not possible to cope with needs to require data before the threshold value is exceeded.

Consequently, a following method is proposed. The method includes measuring a state of the measurement target at a constant rate, and recording measured data on a buffer of a predetermined size (memory or the like). If the buffer becomes full, old data is erased and overwritten with new data. A certain amount of latest data is stored in the buffer. If data exceeds the threshold value, all the data in the buffer is transmitted to the analysis device, and thereafter measured data is sequentially transmitted. According to this method, it is possible to acquire data before the threshold value is exceeded, but an obtainable amount of data before the threshold value is exceeded is limited to the size of the buffer. Because there is a limit for the buffer size, obtainable data before the threshold value is exceeded is limited to data in a short period.

DETAILED DESCRIPTION

According to one embodiment, a data transmission device, includes: a wireless transmitting circuitry transmitting a wireless signal; measurement circuitry measuring a state of a measurement target at a first sampling rate and acquiring a first measurement value of the state of the measurement target; and controlling circuitry determining whether the first measurement value satisfies a first condition based on a first threshold value.

The wireless transmitting circuitry transmits the plurality of first measurement values acquired before the first condition is satisfied when the first condition is satisfied.

The measurement circuitry switches the first sampling rate to a second sampling rate higher than the first sampling rate when the first condition is satisfied, measures a state of the measurement target at the second sampling rate, and acquires a second measurement value of the state of the measurement target. The wireless transmitting circuitry transmits the second measurement value.

Hereinafter, embodiments of the present invention will be described in reference to the drawings. Identical or equivalent elements in the drawings are denoted by the same reference characters, and a detailed description thereof will not be repeated except for extended or changed processing.

First Embodiment

Figure 1:
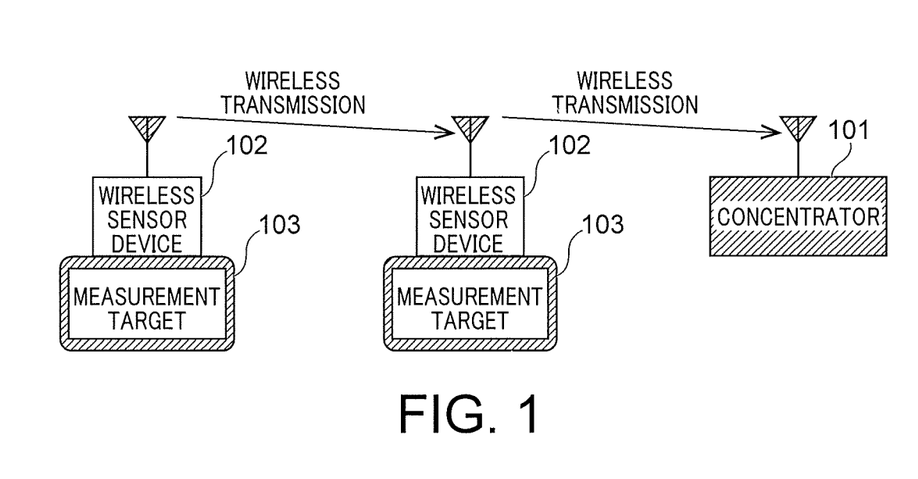
FIG. 1 is a diagram illustrating a data transmission system configuration according to a first embodiment.

FIG. 1 is a diagram illustrating a data transmission system in an embodiment of the invention. The data transmission system includes at least one wireless sensor device 102 and a concentrator 101.

The wireless sensor device 102 measures a state of a measurement target 103 by sampling, and acquires time-series data which is a time series of measurement values (sensing data). As one example, the wireless sensor device 102 measures vibration of the measurement target 103, sound emitted by the measurement target 103, or quaking (fluctuation) of the measurement target 103. The time series of measurement values of the vibration, sound, fluctuation, or the like is waveform data. However, the time series data of the embodiment may be time-series data such as, for example, an operation rate of a CPU, other than the waveform data. Measurement may be sensing using a sensor or may be carried out by calculation like the operation rate of the CPU or the like. A specific example of the measurement target 103 may be anything such as electric apparatuses, buildings, ground, and things existing in nature. In the following, it is assumed that measurement is sensing by a sensor and time-series data is waveform data.

The wireless sensor device 102 may be directly attached to the measurement target 103, or may be disposed at a position away from the measurement target 103. Even when the wireless sensor device 102 is disposed away from the measurement target 103, the state of the measurement target such as sound, fluctuation, or the like can be measured remotely by a microphone, laser sensor, or the like.

The concentrator 101 collects data sensed by each wireless sensor device 102. The concentrator 101 may collect data by direct wireless communication with each wireless sensor device 102. Alternatively, the concentrator 101 and wireless sensor devices 102 may form a multi-hop network and data of each wireless sensor device 102 may be transmitted to the concentrator 101 by a bucket brigade scheme by a relay between the wireless sensor devices 102. FIG. 1 shows a case of the multi-hop network. That is, data of a wireless sensor device 102 is transmitted to the concentrator 101 by a relay. In addition, a wireless sensor device 102 that directly communicates with the concentrator 101 directly transmits its data to the concentrator 101 without relaying by other wireless sensor devices 102.

Figure 2:
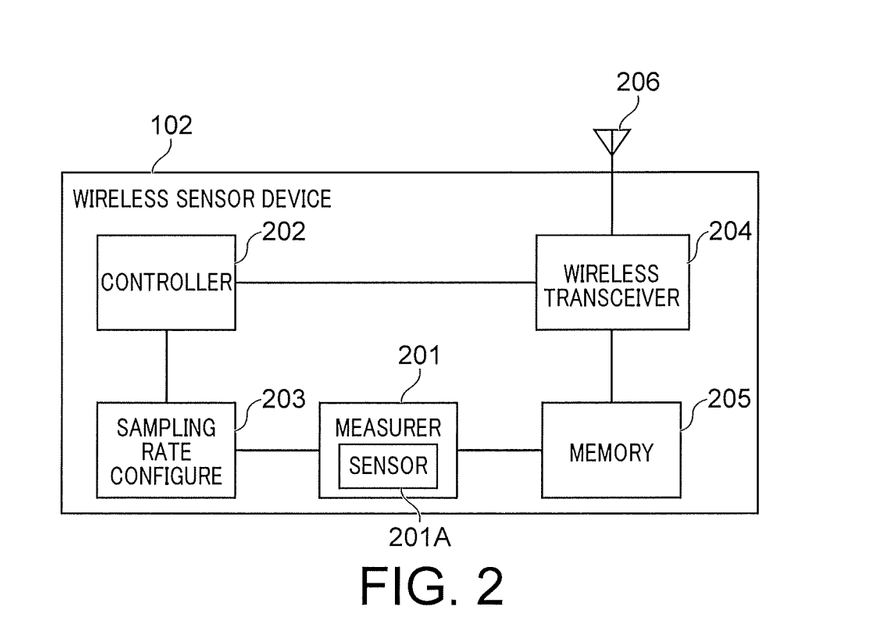
FIG. 2 is a diagram illustrating a wireless sensor device according to the first embodiment.

FIG. 2 is a block diagram illustrating the wireless sensor device 102 in the embodiment. The wireless sensor device 102 includes a measurer 201, a controller 202, a sampling rate configure 203, a wireless transceiver (wireless transmitter and wireless receiver) 204, a memory (storage) 205, and an antenna 206. The wireless transmitter corresponds to wireless transmitting circuitry as one example. The measurer 201 corresponds to measurement circuitry as one example. The controller 202 corresponds to controlling circuitry as one example. Each of the elements can be configured by a processor such as a CPU or a circuit.

The sampling rate configure 203 sets a sampling rate (also referred to as a sampling frequency) of measurement by the measurer 201. As examples of the sampling rate, there are a low sampling rate and high sampling rate (normal sampling rate). As specific examples, the high sampling rate is 100 Hz and the low sampling rate is 2.5 Hz or 10 Hz. An inverse of the sampling rate (sampling frequency) is a sampling period. The embodiment handles two types of the low sampling rate and high sampling rate (normal sampling rate) as the sampling rate. The sampling rate configure 203 sets or switches the sampling rate under control of the controller 202. The sampling rate configure 203 sets the low sampling rate to the measurer 201 as an initial state. The controller 202 may instruct the sampling rate configure 203 to set the initial state for this purpose.

The measurer 201 measures, using a sensor 201A, a state (for example, vibration or emitted sound) of the measurement target 103 at the sampling rate instructed by the sampling rate configure 203. Examples of the sensor 201A include, but are not limited to, a vibration sensor, a microphone, a gyroscope, an acceleration sensor, a temperature sensor, a humidity sensor, a laser sensor, and the like. The measurer 201 converts an analog signal detected by the sensor 201A into a digital value. The measurer 201 is connected with the memory 205, and stores sensing data, which is a digital value, in the memory 205. When the memory 205 becomes full, oldest data is erased and overwritten with new data. Therefore, in the memory 205, latest data for period length corresponding to the sampling rate and a memory capacity is stored. Here, the measurer 201 performs measurement using the sensor 201A, but a configuration to perform measurement without using a sensor (for example, calculation of the operation rate of the CPU) is also possible.

The memory 205 is a storage that stores data such as sensing data and arbitrary information. The memory 205 has a predetermined memory capacity. The memory 205 may be a volatile memory such as DRAM or SRAM or a nonvolatile memory such as NAND, FRAM, or MRAM.

The controller 202 receives a measurement value (sensing data) by the measurer 201 every time the sensing data is acquired. It may directly receive from the measurer 201 and may receive from the memory 205. The controller 202 determines whether the sensing data satisfies a condition (first condition) based on a threshold value (first threshold value). In the embodiment, as an example of satisfying the first condition, it is assumed that the threshold value is first exceeded. However, other examples are also possible, such as a case where the condition is satisfied when the threshold value is first lowered or when the data falls within a certain range with reference to the threshold value.

If the controller 202 determines that the sensing data exceeds the threshold value, the controller 202 transmits information indicating that the threshold value is exceeded to the sampling rate configure 203. On receiving the information, the sampling rate configure 203 switches the sampling rate of the measurer 201 to the high sampling rate. In addition, the controller 202 outputs a data transmission instruction to the wireless transceiver 204 if the sensing data exceeds the threshold value.

On receiving the data transmission instruction from the controller 202, the wireless transceiver 204 sequentially reads out data acquired before it is determined that the threshold value is exceeded (before the first condition is satisfied), in more detail, the data stored in the memory 205 (data sampled at the low sampling rate), converts the readout data into a wireless signal, and transmits the wireless signal via the antenna (batch transmission). Regarding order of reading, as an example, data is read out and transmitted in order from the oldest data timewise. However, if a reception side is equipped with a mechanism for rearranging data, it is not limited to this. For example, the mechanism may be achieved by giving data information on time when the data was measured and transmitting the data with the given information. The wireless transceiver 204 converts data that is input from the memory 205 into a wireless signal, and transmits the wireless signal via the antenna. As an example, the wireless signal has a form of a frame (also referred to as a packet) corresponding to a communication scheme to be used. The wireless signal is transmitted to the concentrator 101 via a relay of other wireless sensor devices 102 or directly transmitted to the concentrator 101. The memory 205 sends the stored data to the wireless transceiver 204 in accordance with an instruction from the controller 202.

After transmitting all the data in the memory 205, the wireless transceiver 204 sequentially transmits sensing data (data measured at the high sampling rate) acquired from the measurer 201 (real-time transmission). During real-time transmission, the wireless transceiver 204 may directly receive the sensing data from the measurer 201 or may use the memory 205 as a buffer and receive the data via the buffer. During batch transmission, the wireless transceiver 204 may temporarily store the sensing data (data measured at the high sampling rate) acquired from the measurer 201 by using an already-transmitted area (empty area) in the memory 205, and read out and transmit the stored data during real-time transmission. Alternatively, the wireless transceiver 204 may temporarily store the sensing data acquired during batch transmission in a different area, and read out and transmit the continuation of the sensing data from the area after batch transmission. As long as batch transmission and real-time transmission can be consecutively performed, any method may be used.

If a predetermined termination condition is satisfied, the controller 202 determines to terminate sampling at the high sampling rate or data transmission. In this case, the controller 202 instructs the sampling rate configure 203 to return the sampling rate to the low sampling rate. Furthermore, the controller 202 outputs a stop instruction on data transmission to the wireless transceiver 204. The wireless transceiver 204 stops transmission in accordance with the stop instruction. Examples of the predetermined termination condition include an elapse of a certain time from data transmission start (start of batch transmission or start of real-time transmission) or sensing data from the measurer 201 or an average value thereof (including moving average) falling below the threshold value. For example, when it is expected that vibration will be stopped after an elapse of a certain time from start of the vibration, the elapse of the certain time from data transmission start may be used as a termination condition.

Figure 3:
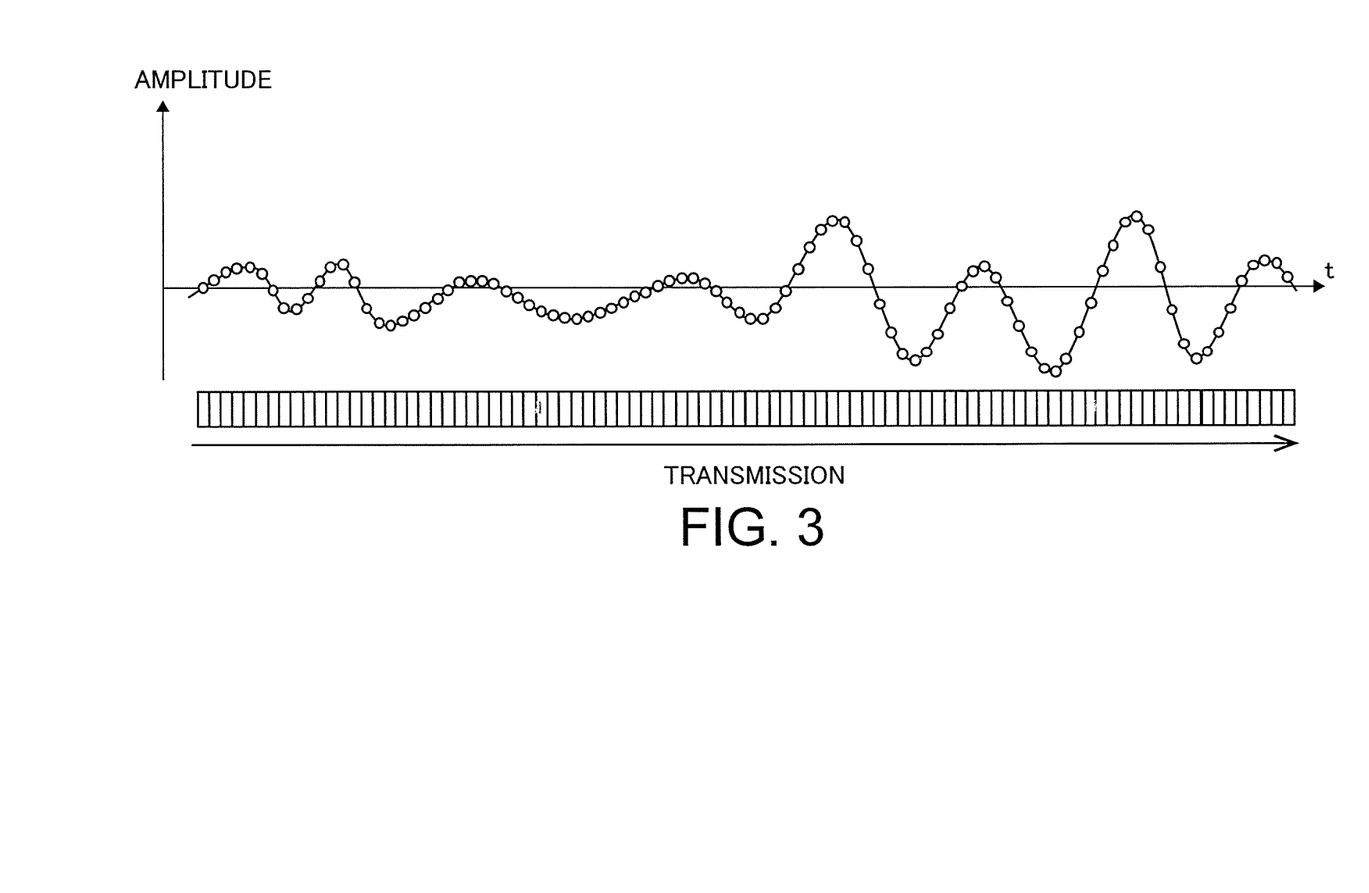
FIG. 3 is an operation explanatory diagram of a first related art.

Hereinafter, a specific example of operation of the wireless sensor device 102 in FIG. 1 will be described in comparison with related arts. FIG. 3 is a diagram for illustrating an operation example of a first related art, FIG. 4 for illustrating an operation example of a second related art, and FIG. 5 for illustrating an operation example of the present embodiment. FIG. 6 is a sequence diagram of an operation example of a data transmission system according to the present embodiment.

In the operation example of the first related art illustrated in FIG. 3, a measurer measures a state (for example, vibration) of a measurement target by sampling at an always constant sampling rate and sequentially transmits measured sensing data. A horizontal axis is a time axis and a vertical axis represents an amplitude value. Circles in the figure denote points (sampling points) obtained by plotting the sensing data in a coordinate system, and a waveform in which the sampling points are smoothly connected is shown. Under the waveform, data measured at each sampling point is schematically represented by a rectangle. The data is sequentially transmitted from a left side along the figure by wireless. Because this method transmits all data sampled at a constant rate, there is no loss of data, but an amount of data to be transmitted becomes huge. Therefore, there is a problem that a battery of a device is consumed and its communication cost (communication expenses and the like) becomes high.

Figure 4:
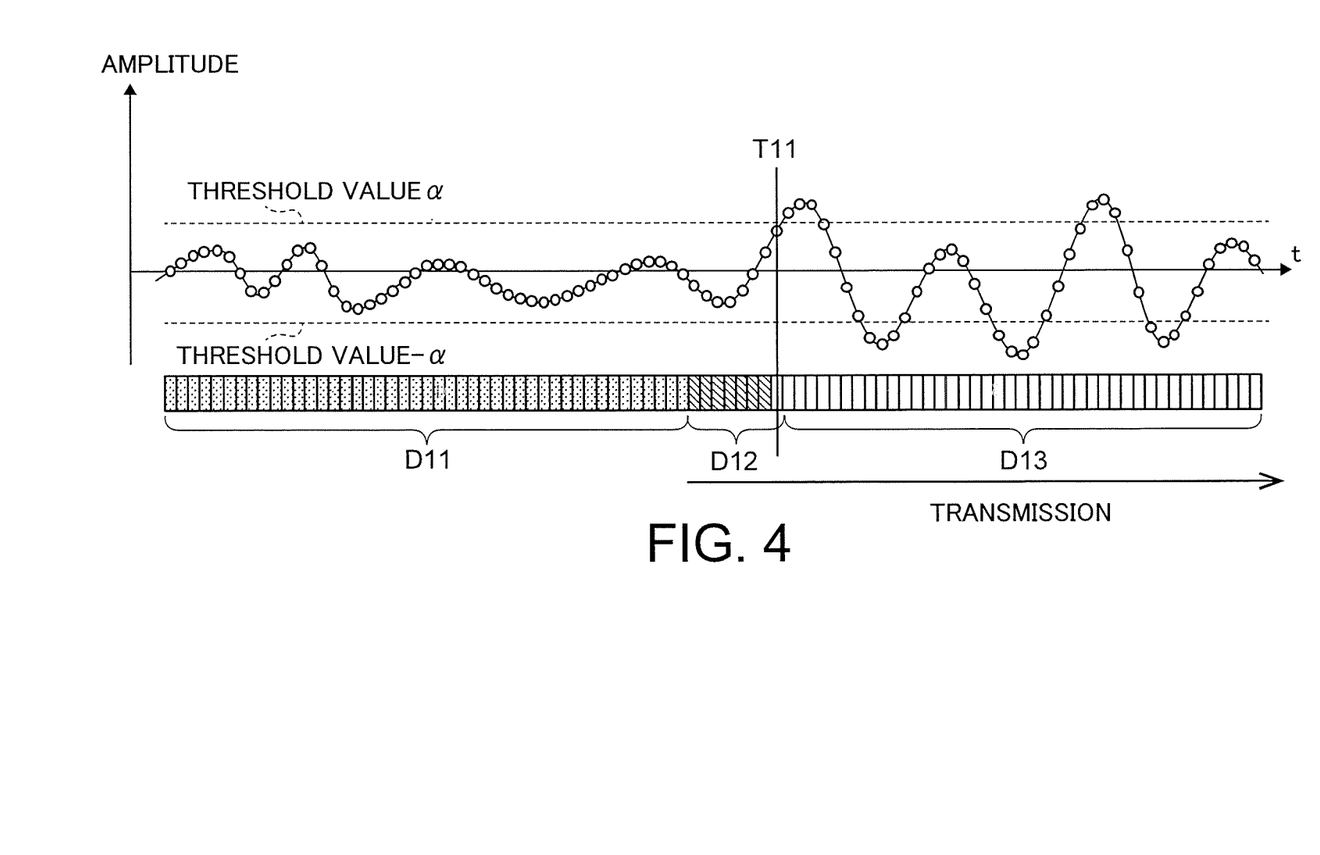
FIG. 4 is an operation explanatory diagram of a second related art.

In the operation example of the second related art illustrated in FIG. 4, data sampled at a constant sampling rate is written into a memory. When the memory becomes full, oldest data is erased and overwritten with new data. As a result, a constant amount of latest data is stored in the memory. Data D11 represented by each rectangle in the figure is data erased due to overwriting in the memory. If sensing data (amplitude) exceeds a threshold value (any of a positive side threshold value "a" and a negative side threshold value "-α"), all the data in the memory is first transmitted. Thereafter, measured data is sequentially transmitted. In the example of the figure, because the sensing data exceeds the threshold value "α" at time T11, data D12 existing in the memory at this point is first transmitted, and then data D13 measured (sampled) after the time T11 is sequentially transmitted. According to this method, in the case where data (data D12 in the figure) before the threshold value is exceeded is transmitted, an amount of transmission data that can be transmitted is limited to a size of the memory. Because there usually is a limit to a memory size, the amount of data that can be transmitted of data obtained before the threshold value is exceeded is limited to data in a short period.

Figure 5:
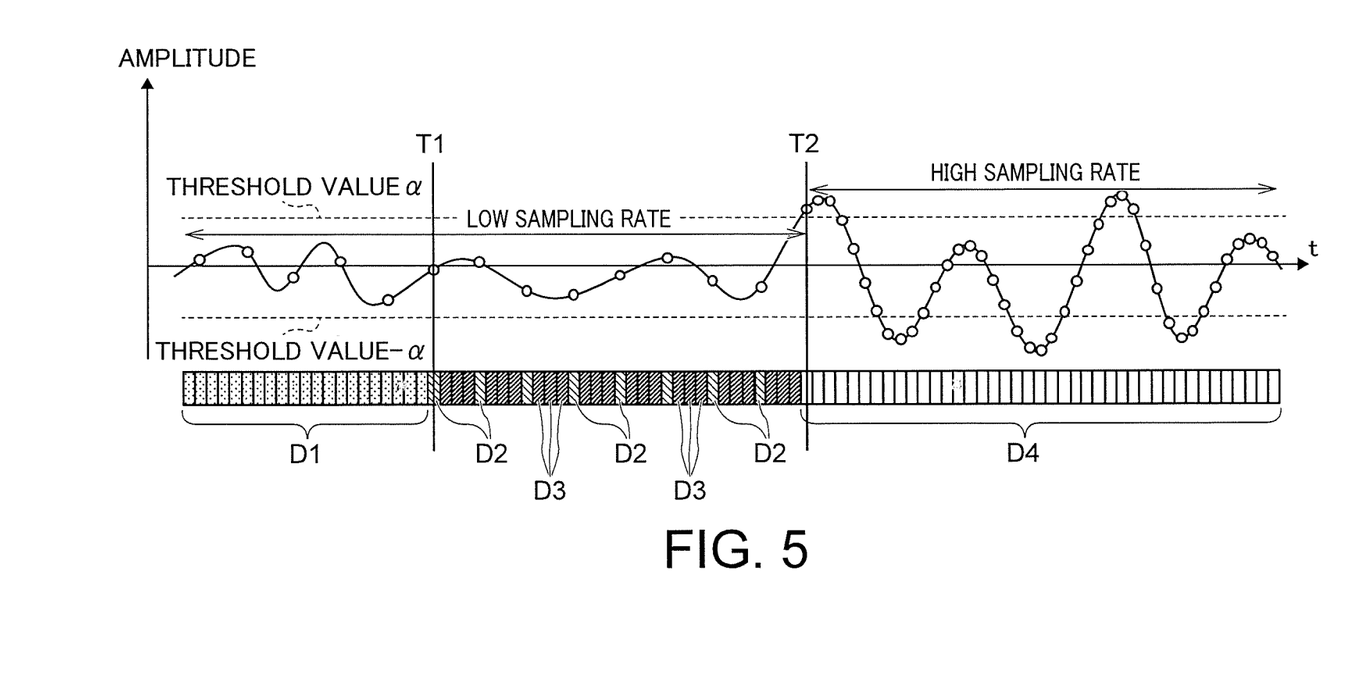
FIG. 5 is an operation explanatory diagram of the wireless sensor device according to the first embodiment.
Figure 6:
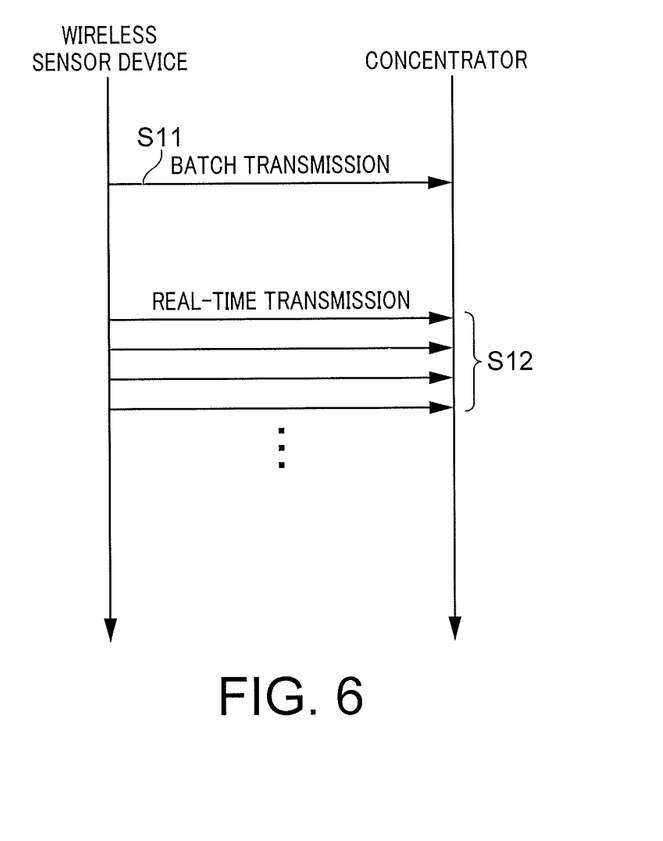
FIG. 6 is a sequence diagram of an operation example according to the first embodiment.

In the operation example of the embodiment illustrated in FIG. 5, data sampled at the low sampling rate is written into the memory 205. In the illustrated example, the low sampling rate is a quarter of the sampling rate of the first and second related arts. If the memory 205 is full, the oldest data is erased and overwritten with new data. Data D1 represented by each rectangle in the figure indicates data erased by overwriting in the memory 205, or data that is not sampled because the sampling rate is set low in the embodiment although the data is sampled in the first and second related arts. Data D2 represented by each rectangle is data existing in the memory 205 at time T2 when the sensing data (amplitude) exceeds the threshold value. In other words, data sampled after time T1 still remains in the memory 205 without being overwritten. Data D3 represented by each rectangle indicates data which is sampled in the first and second related arts, but not sampled in the embodiment because the sampling rate was made low (therefore, the data D3 does not exist in the memory 205). The concentrator 101 on the reception side can estimate the data D3 by performing data interpolation processing (linear interpolation, polynomial interpolation, spline interpolation, or the like) on the data D2 (details will be described in a third embodiment). When the sensing data (amplitude) exceeds the threshold value (either the positive side threshold value "α" or negative side threshold value "-α"), all the data in the memory 205 is transmitted (batch transmission). In the example in FIG. 5, because the amplitude exceeds the threshold value "α" at the time T2, all the data D2 existing in the memory 205 at this point is transmitted. In the example of the operation sequence in FIG. 6, at a sequence S11, the wireless sensor device 102 performs batch transmission because the threshold value is exceeded. In addition, when the sensing data exceeds the threshold value at the time T2, the sampling rate of the measurer 201 is changed to the high sampling rate (same sampling rate as the first and second related arts). After the time T2, data D4 represented by each rectangle is measured at the high sampling rate, and measured sensing data is transmitted to the concentrator 101 (real-time transmission). In the example of the operation sequence in FIG. 6, after the sequence S11 of batch transmission, sensing data measured at the high sampling rate is sequentially transmitted every time it is measured (sequence S12).

Figure 7:
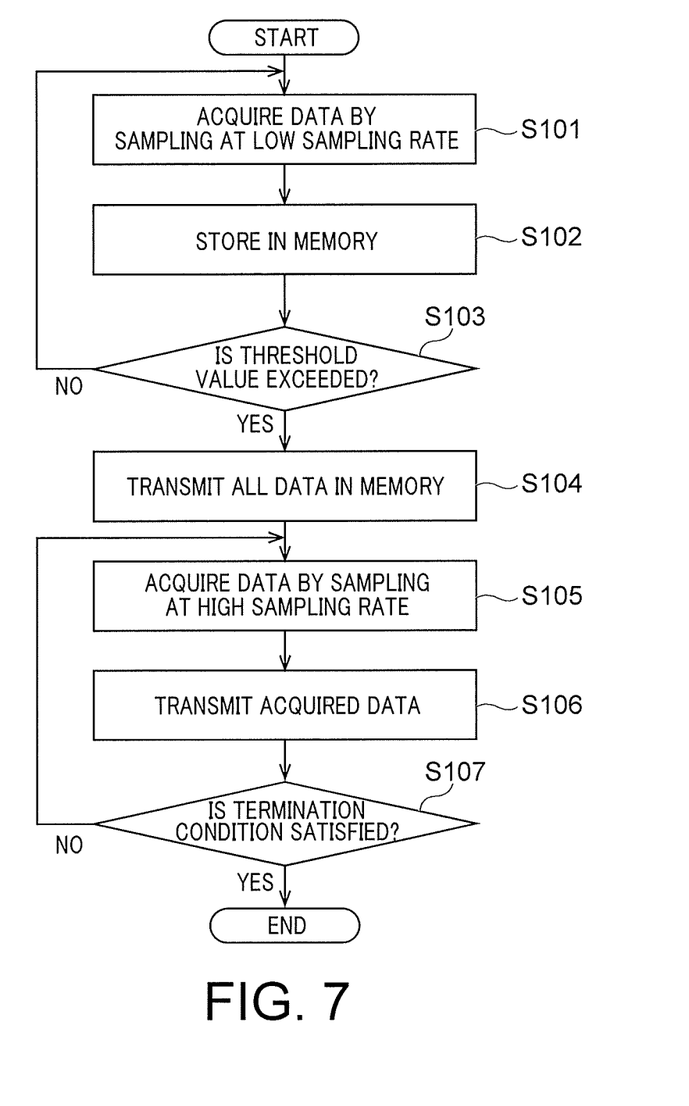
FIG. 7 is a flowchart of an operation example of the wireless sensor device according to the first embodiment.

FIG. 7 is a flowchart of an operation example of the wireless sensor device 102 according to the embodiment. The measurer 201 measures a state of a measurement target by sampling at the low sampling rate (S101) and stores measured data (sensing data) in the memory 205 (S102). If the memory 205 is full, oldest data is overwritten. The controller 202 compares the sensing data with the threshold value, and determines whether the sensing data exceeds the threshold value (S103). If the threshold value is not exceeded (NO), the operation returns to step S101. If the threshold value is exceeded (YES), the controller 202 transmits all the data in the memory 205 via the wireless transceiver 204 (S104). At this time, the controller 202 transmits the data in order from the oldest data in the memory 205. Information on measured time may be given to each piece of data, and the data given the time may be transmitted. Then, the concentrator 101 can rearrange the data in time series on the basis of the information on time. The transmitted data is delivered to the concentrator 101 by a relay of other wireless sensor devices or delivered directly to the concentrator 101. The controller 202 transmits information indicating that the threshold value is exceeded to the sampling rate configure 203, which in turn instructs the measurer 201 to switch its sampling rate to the high sampling rate. The sampling rate configure 203 switches the sampling rate from the low sampling rate to the high sampling rate. The measurer 201 measures the state of the measurement target by sampling at the high sampling rate (S105), and the wireless transceiver 204 transmits measured data (sensing data) (S106). The controller 202 determines whether the termination condition is satisfied (S107), returns to step S105 if the termination condition is not satisfied (NO), and terminates the processing if the termination condition is satisfied (YES).

As described above, according to the first embodiment, measurement is performed at the low sampling rate before sensing data exceeds the threshold value, and the sensing data is stored in the memory 205. If sensing data exceeds the threshold value, the sensing data stored in the memory 205 is collectively transmitted, and thereafter sensing data measured at the high sampling rate is sequentially transmitted. The concentrator 101 performs data interpolation processing on sensing data acquired, for example, at the low sampling rate so that the sensing data becomes a data sequence at the same period as a sampling period (inverse of the sampling frequency) of the high sampling rate. As a result, data representing the state of the measurement target in a period during which the sensing data was acquired can be acquired at the same sampling period as the high sampling rate (regarding details, see the third embodiment described later). The concentrator 101 merges the acquired data and the sensing data measured at the high sampling rate in a time direction, thereby acquires time-series data (waveform data) including information on the state of the measurement target from before the threshold value is exceeded, and can make analysis requiring the information on the state of the measurement target from before the threshold value is exceeded.

Second Embodiment

In the first embodiment, two sampling rates (low sampling rate and high sampling rate) are switched, but in the present embodiment, three sampling rates are switched. They are a low sampling rate, medium sampling rate, and high sampling rate (normal sampling rate). A block diagram of a wireless sensor device 102 of the embodiment is the same as FIG. 2 of the first embodiment.

In the embodiment, a plurality of threshold values for changing the sampling rate are provided. For example, a threshold value "α" and threshold value "β" on a positive side and a threshold value "−α" and threshold value "−β" on a negative side are provided. The "α" and "β" are positive actual numbers and the "−α" and "−β" are negative actual numbers of which absolute values are the same as those of "α" and "β" respectively. The threshold value "α" or threshold value "−α" (hereinafter "α/−α") corresponds to a first threshold value, and the threshold value "β" or threshold value "−β" (hereinafter "β/−β") corresponds to a second threshold value. In the embodiment, the low sampling rate is used before a condition (first condition) based on "α/−α" is satisfied; the medium sampling rate is used from after the condition based on "α/−α" is satisfied to before a condition (second condition) based on "β/−β" is satisfied; and the high sampling rate is used after the condition based on "β/−β" is satisfied. It is assumed that satisfying the first condition is to exceed "α/−α" and satisfying the second condition is to exceed "β/−β." However, contents of the first condition and second condition are not limited to those and other various examples are possible in the same manner as the first embodiment.

When it is detected as the operation of the controller 202 that the sensing data of the measurer 201 exceeds "α/−α", the controller 202 transmits information indicating that "α/−α" is exceeded to the sampling rate configure 203. When the sensing data of the measurer 201 exceeds "β/−β," the controller 202 transmits information indicating that "β/−β" is exceeded to the sampling rate configure 203. Furthermore, when the sensing data exceeds "β/−β," the controller 202 outputs a data transmission instruction to the wireless transceiver 204. Operation of the wireless transceiver 204 when receiving the data transmission instruction is the same as the first embodiment. Conversely, when the controller 202 detects that the sensing data of the measurer 201 falls to or below "α/−α," the controller 202 may transmit information indicating that the sensing data becomes "α/−α" or less to the sampling rate configure 203. In addition, when the sensing data of the measurer 201 falls to or below "β/−β," the controller 202 may transmit information indicating that the sensing data becomes "β/−β" or less to the sampling rate configure 203.

The sampling rate configure 203 sets the low sampling rate to the measurer 201 as an initial operation. Sensing data measured at the low sampling rate is stored in the memory 205. On receiving information indicating that "α/−α" is exceeded from the controller 202, the sampling rate configure 203 changes the sampling rate of the measurer 201 to the medium sampling rate. Thereafter, data sampled at the medium sampling rate is stored in the memory 205. In addition, on receiving information indicating that "β/−β" is exceeded from the controller 202, the sampling rate configure 203 changes the sampling rate to the high sampling rate. On receiving information indicating that the sensing data becomes "α/−α" or below from the controller 202, the sampling rate configure 203 may change the sampling rate of the measurer 201 from the medium sampling rate to the low sampling rate. On receiving information indicating that the sensing data becomes "β/−β" or below from the controller 202, the sampling rate configure 203 may change the sampling rate of the measurer 201 from the high sampling rate to the medium sampling rate.

Figure 8:
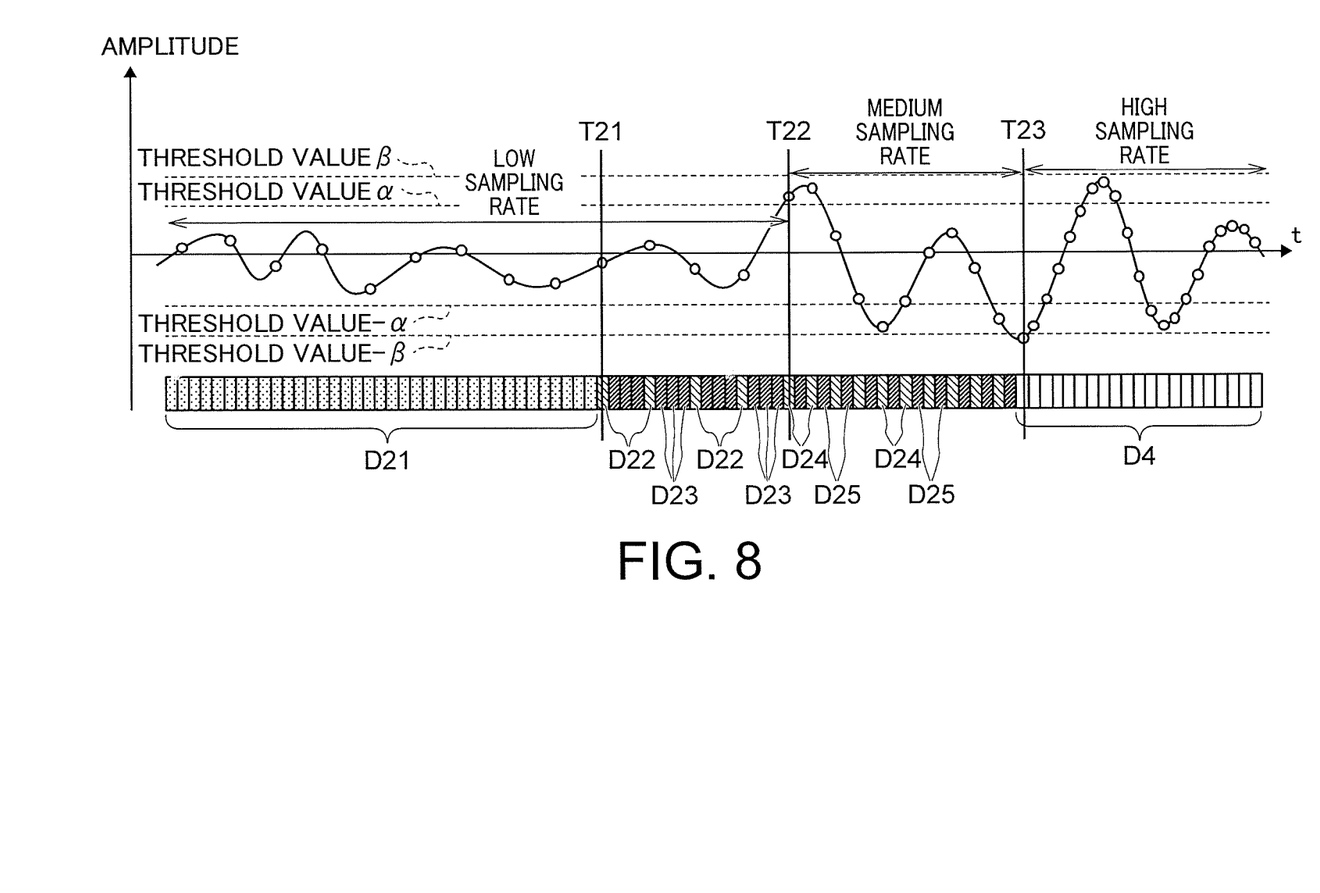
FIG. 8 is an operation explanatory diagram of a wireless sensor device according to a second embodiment.

FIG. 8 is a diagram for illustrating an operation example of the second embodiment. Data D21 represented by each rectangle in the figure indicates data erased by overwriting in the memory 205 before time T21, or data not measured.

Data D22 represented by each rectangle is data remaining in the memory 205 of data sampled at the low sampling rate after the time T21. That is, data sampled after the time T21 remains in the memory 205 without being overwritten. Data D23 is data not sampled at the low sampling rate after the time T21.

When the sensing data exceeds the threshold value "α" at time T22, the sampling rate is changed from the low sampling rate to the medium sampling rate. Data D24 represented by each rectangle is data sampled at the medium sampling rate and remaining in the memory 205, and data D25 represented by each rectangle is data not sampled at the medium sampling rate. Regarding data measured (sampled) at the time T22, it can be said that it is data first measured at the medium sampling rate, and can be also said that it is data last sampled at the low sampling rate.

When the sensing data exceeds the threshold value "−β" at time T23, all the data D22 and D24 existing in the memory 205 at this time point are transmitted in time series. In other words, in the example, the memory 205 stores the sensing data D22 measured at the low sampling rate from the time T21 to the time T22 and the sensing data D24 measured at the medium sampling rate from the time T22 to before the time T23, and the data D22 and D24 are read out in order of time from earliest measurement and transmitted (batch transmission). In addition, the sampling rate is changed from the medium sampling rate to the high sampling rate, and thereafter data D4 represented by each rectangle is acquired by sampling at the high sampling rate and sequentially transmitted (real-time transmission). Regarding data measured (sampled) at the time T23, it can be said that it is data first measured at the high sampling rate, and can be also said that it is data last sampled at the medium sampling rate.

In the embodiment, a plurality of threshold values are provided on each of the positive side and negative side, the sampling rate is increased in stages before start of data transmission, thereby sensing data close to "β/−β" can be acquired at a higher rate, and at the same time a period of sensing data acquired before "β/−β" is exceeded can be lengthened.

Third Embodiment

In the present embodiment, a configuration and operation of a concentrator 101 will be described. The concentrator 101 of the embodiment can be used as any of the concentrators 101 of the first embodiment and second embodiment. The concentrator 101 of the embodiment performs interpolation (data interpolation processing) so that data measured at the low or medium sampling rate of sensing data aggregated from the wireless sensor device 102 becomes data at the same period as a sampling period of the high sampling rate (normal sampling rate). As an interpolation scheme, any of known schemes such as linear interpolation, polynomial interpolation, and spline interpolation can be used. Here, the high sampling rate is used as a rate to be interpolated, but other rates may be used as long as they are higher than an original sampling rate.

Figure 9:
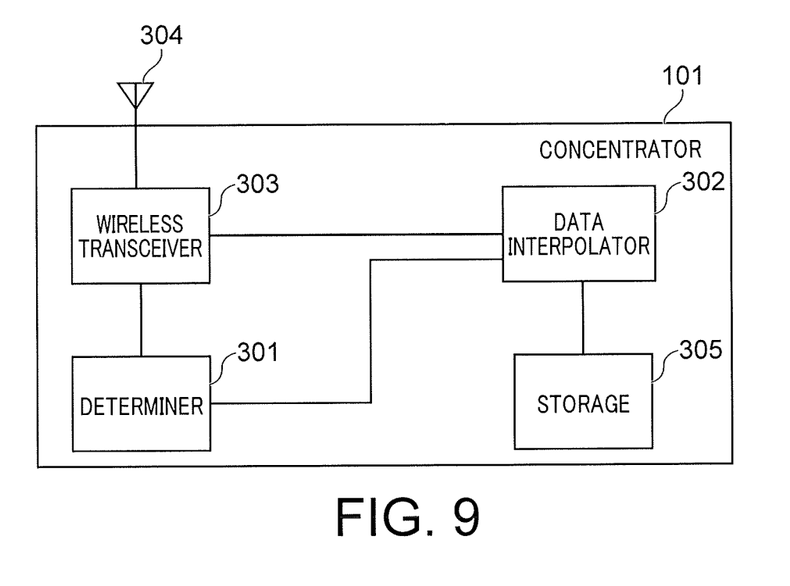
FIG. 9 is a diagram illustrating a concentrator according to a third embodiment.

FIG. 9 is a diagram illustrating a device configuration of the concentrator (data reception device) 101 according to the third embodiment. The concentrator 101 includes a determiner 301, a data interpolator 302, a wireless transceiver (wireless transmitter and wireless receiver) 303, an antenna 304, and a storage 305.

The wireless transceiver 303 receives a wireless signal via the antenna, demodulates the received wireless signal, and thereby acquires a frame. The wireless transceiver 303 extracts information on a transmission source and sensing data from the frame. The sensing data received from the transmission source has been associated with time (for example, measurement time). As an example of the information on the transmission source, there is identification information (for example, an address) on a wireless sensor device 102 that has generated the sensing data. In addition, the frame may include other information. For example, information on measurement time of the sensing data may be included. The wireless transceiver 303 receives the sensing data from the transmission source in order of time from earliest measurement (i.e., in order of temporally earlier measurement values). Alternatively, the wireless transceiver 303 rearranges the received sensing data on the basis of the measurement time.

The determiner 301 determines whether the received sensing data satisfies a condition based on a threshold value. As the condition here, it is assumed that the sensing data first exceeds the threshold value. The condition is however not limited to this and various other examples are possible in the same manner as the first or second embodiment. The determiner 301 transmits a determination result indicating whether the sensing data exceeds the threshold value to the data interpolator 302. For example, in the case of the first embodiment, it is determined whether the threshold value "α/−α" is exceeded. In the case of the second embodiment, it is determined whether the threshold value "α/−α" is exceeded or whether the threshold value "β/−β" is exceeded.

The data interpolator 302 receives the determination result from the determiner 301 and acquires the sensing data and the information on the transmission source from the wireless transceiver 303. The data interpolator 302 identifies a sampling rate when the sensing data was measured (sampled) on the basis of the determination result. For example, in the case of the first embodiment: if the determination result indicates that "α/−α" is not exceeded, the sampling rate is identified as the low sampling rate; and if the determination result indicates that "α/−α" is exceeded, it is identified as the high sampling rate. In the case of the second embodiment: if the determination result indicates that "α/−α" is not exceeded, the sampling rate is identified as the low sampling rate; and if the determination result indicates "α/−α" is exceeded but "β/−β" is not exceeded, it is identified as the medium sampling rate. If the determination result indicates that "β/−β" is exceeded, it is identified as the high sampling rate.

If the identified sampling rate is the low sampling rate, the data interpolator 302 performs data interpolation processing corresponding to the low sampling rate and thereby obtains data interpolated so that it has the same period as the sampling period of the high sampling rate. For example, if the high sampling rate is four times the low sampling rate, the data interpolator 302 obtains three pieces of data to be added to between adjacent pieces of the sensing data by interpolation, and adds the obtained data (interpolation data or interpolated values). In this way, it is possible to obtain interpolation processed data (in which three pieces of interpolation data are added to between adjacent pieces of the sensing data at the low sampling rate) at the same period as the sampling period of the high sampling rate.

If the identified sampling rate is the medium sampling rate, the data interpolator 302 performs data interpolation processing corresponding to the medium sampling rate and thereby obtains data interpolated so that it has the same period as the sampling period of the high sampling rate. For example, if the high sampling rate is two times the medium sampling rate, the data interpolator 302 obtains one piece of data to be added to between adjacent pieces of the sensing data by interpolation, and adds the obtained data (interpolation data or interpolated values). In this way, it is possible to obtain interpolation processed data (in which one piece of interpolation data is added to between adjacent pieces of the sensing data at the medium sampling rate) at the same period as the sampling period of the high sampling rate.

If the identified sampling rate is the high sampling rate, the data interpolator 302 does not perform data interpolation processing.

The storage 305 stores therein data of which processing by the data interpolator 302 is completed (for example, sensing data at the low or medium sampling rate, interpolation data added to the sensing data by interpolation, and sensing data at the high sampling rate without being subjected to data interpolation processing) as time-series data in association with the identification information on the transmission source. The storage 305 may be a memory or storage, or may be another medium for storing information.

Figure 10:
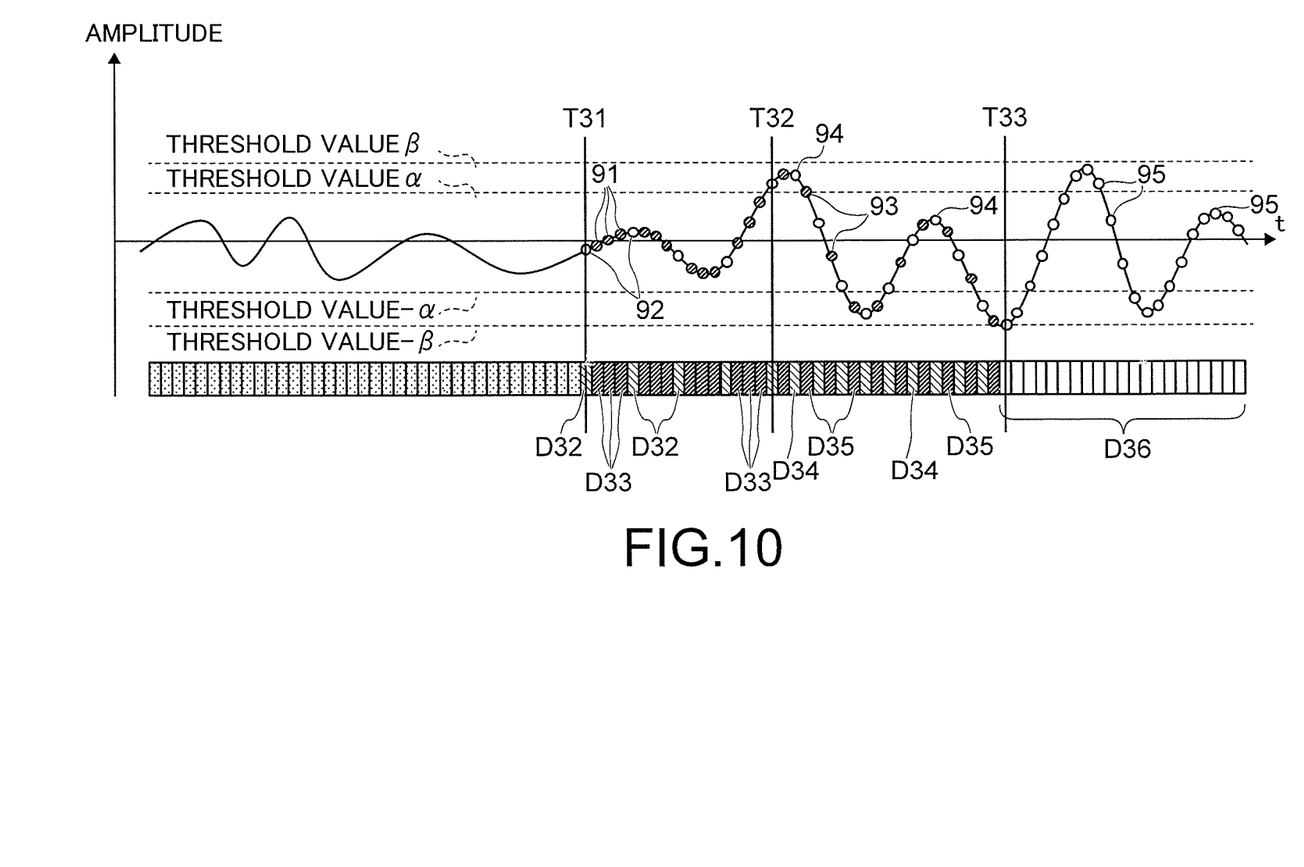
FIG. 10 is an operation explanatory diagram of the concentrator according to the third embodiment.

FIG. 10 is a schematic diagram illustrating a specific example of operation of the concentrator 101. Here, the diagram illustrates operation of the concentrator 101 in the case where the wireless sensor device 102 performs the operation in FIG. 8 of the second embodiment.

At time T31 the wireless transceiver 303 starts receiving sensing data. The determiner 301 determines that the sensing data does not exceed "α/−α" at the time T31. The data interpolator 302 performs data interpolation processing corresponding to the low sampling rate until it is determined that "α/−α" is exceeded. Here, because the determiner 301 determines that the threshold value "α" is exceeded at time T32, the data interpolator 302 performs data interpolation processing corresponding to the low sampling rate on the sensing data from the time T31 to before the time T32 (i.e., the measurement values associated with times before the time T 32). Points (circles with diagonal lines) 91 representing data (interpolation data) added by data interpolation processing are plotted in the coordinate system. Under each point 91, added interpolation data D33 is represented by a rectangle. In other words, regarding every two adjacent pieces of sensing data, three pieces of interpolation data are obtained and added to between the pieces. In addition, points (open circles) 92 representing the received sensing data are plotted in the coordinate system, and under each point 92, received sensing data D32 is displayed by a rectangle.

The determiner 301 determines that the threshold value "α" is exceeded at the time T32. Therefore, the data interpolator 302 performs data interpolation processing corresponding to the medium sampling rate until it is determined next that "β/−β" is exceeded. Here, because the determiner 301 determines that the threshold value "−β" is exceeded at time T33, the data interpolator 302 performs data interpolation processing corresponding to the medium sampling rate on sensing data from the time T32 to before the time T33 (i.e., the measurement values associated with times before the time T 33). Points (circles with diagonal lines) 93 representing data (interpolation data) added by data interpolation processing are plotted in the coordinate system. Under each point 93, added interpolation data D35 is represented by a rectangle. In other words, regarding every two adjacent pieces of sensing data, one piece of interpolation data is obtained and added to between the pieces. In addition, points (open circles) 94 representing the received sensing data are plotted, and under each point 94, received sensing data D34 is displayed by a rectangle.

The data interpolator 302 determines not to perform data interpolation processing because sensing data received after time T33 is measured at the high sampling rate. In the figure, points (open circles) 95 representing sensing data received after the time T33 are plotted in the coordinate system, and under each point 95, received sensing data D36 is displayed by a rectangle.

By the above-described data interpolation processing, the concentrator 101 can restore data at the same sampling period as that of the high-speed sampling rate (normal sampling rate) from the received wireless signal.

In the embodiment, the concentrator 101 compares sensing data with the threshold value, and thereby identifies a sampling rate at which the sensing data was measured, but as another method, the wireless sensor device 102 may include information identifying a used sampling rate in a frame of a wireless signal to be transmitted. In this case, the determiner 301 of the concentrator 101 may interpret the information in the frame, and thereby identify the sampling rate when the received sensing data was measured.

Figure 11:
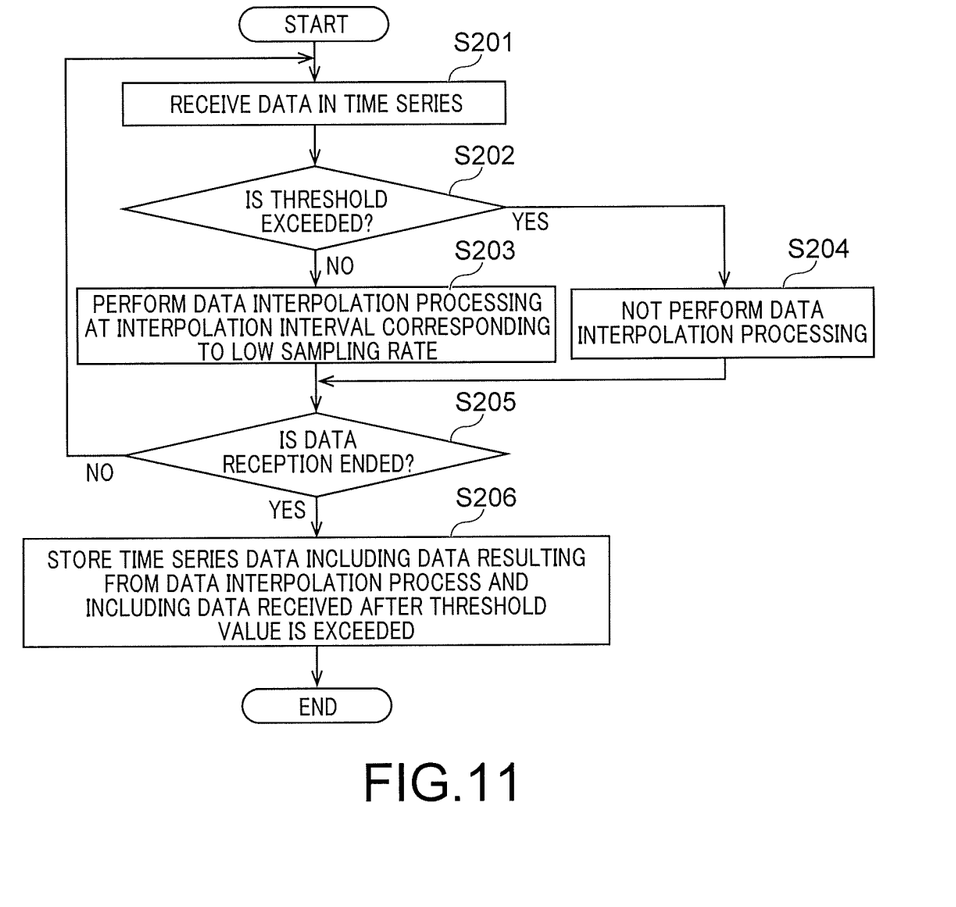
FIG. 11 is a flowchart of an operation example of the concentrator according to the third embodiment.

FIG. 11 is a flowchart of an operation example of the concentrator 101 according to the embodiment. Here, it is assumed that sensing data of a wireless sensor device 102 is received in the first embodiment.

The wireless transceiver 303 receives multiple pieces of data (sensing data, that is, measurement values) in time series via a wireless signal (S201). If the data is given information on time, the received data may be arranged in order of time. The determiner 301 in turn compares each piece of data with the threshold value, and determines whether the threshold value is exceeded (S202). The data interpolator 302 performs data interpolation processing corresponding to the low sampling rate (S203) for data determined not to exceed the threshold value (NO). If it is determined that the threshold vale is exceeded (YES), the data interpolator 302 determines not to perform data interpolation processing for subsequent data (S204). It is determined whether data reception has ended (S205), the operation returns to step S201 if data reception has not ended (NO). If data reception has ended (YES), the data interpolator 302 generates time-series data including data after data interpolation processing and data received after the threshold value is exceeded, and then stores the time-series data in the storage 305 (S206). When the time-series data is stored in the storage 305, the time-series data may be associated with the identification information on the wireless sensor device 102 of a transmission source. In the above-described example in FIG. 10, data (D32, D33, D34, D35, and D36) represented by each rectangle disposed at a lower part of the figure corresponds to the relevant time-series data.

The wireless sensor device 102 and the concentrator 101 in each embodiment may also be realized using a general-purpose computer device as basic hardware. That is, each function provided in the wireless sensor device 102 and the concentrator 101 can be realized by causing a processor mounted in the above described computer device to execute a program. In this case, the wireless sensor device 102 and the concentrator 101 may be realized by installing the above described program in the computer device beforehand or may be realized by storing the program in a storage medium such as a CD-ROM or distributing the above described program over a network and installing this program in the computer device as appropriate. Furthermore, the storage provided in the wireless sensor device 102 and the concentrator 101 may also be realized using a memory device or hard disk incorporated in or externally added to the above described computer device or a storage medium such as CD-R, CD-RW, DVD-RAM, DVD-R as appropriate.

The terms used in each embodiment should be interpreted broadly. For example, the term "processor" may encompass a general purpose processor, a central processing unit (CPU), a microprocessor, a digital signal processor (DSP), a controller (controlling circuitry), a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

The term "storage" may encompass any device which can permanently memorize data using magnetic technology, optical technology or non-volatile memory etc. For example, the storage may be an HDD (Hard Disk Drive), an optical disc, an SSD (Solid State Drive) or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data transmission device, comprising:
    wireless transmitting circuitry configured to transmit a wireless signal;
    measurement circuitry configured to measure a state of a measurement target at a first sampling rate and acquire a first measurement value of the state of the measurement target; and
    controlling circuitry configured to determine whether the first measurement value satisfies a first condition based on a first threshold value, wherein:
    the wireless transmitting circuitry does not transmit the first measurement values before the first condition is satisfied and, after the first condition is satisfied, transmits the first measurement values acquired before the first condition is satisfied;
    the measurement circuitry switches the first sampling rate to a second sampling rate higher than the first sampling rate when the first condition is satisfied, measures a state of the measurement target at the second sampling rate, and acquires a second measurement value of the state of the measurement target; and
    the wireless transmitting circuitry transmits the second measurement value.

2. The data transmission device according to claim 1, wherein
    the controlling circuitry determines that the first condition is satisfied when the first measurement value exceeds the first threshold value.

3. The data transmission device according to claim 1, further comprising
    a memory configured to store the first measurement value acquired by the measurement circuitry, wherein
    the wireless transmitting circuitry transmits the first measurement value in the memory when the first condition is satisfied.

4. The data transmission device according to claim 1, wherein:
    the measurement circuitry measures a state of the measurement target at a third sampling rate lower than the first sampling rate and acquires a third measurement value of the state of the measurement target;
    the controlling circuitry determines whether the third measurement value satisfies a second condition based on a second threshold value;
    the measurement circuitry switches the third sampling rate to the first sampling rate when the second condition is satisfied, measures a state of the measurement target at the first sampling rate, and acquires the first measurement value;
    the controlling circuitry determines whether the first measurement value satisfies the first condition; and
    the wireless transmitting circuitry transmits the plurality of third measurement values and the plurality of first measurement values acquired before the first condition is satisfied when the first condition is satisfied.

5. The data transmission device according to claim 4, further comprising
    a memory configured to store the third measurement value and first measurement value acquired by the measurement circuitry, wherein
    the wireless transmitting circuitry transmits the third measurement value and first measurement value in the memory when the first condition is satisfied.

6. A non-transitory computer readable medium having a computer program stored therein which causes a computer to perform processes when the computer program is executed by the computer, the processes, comprising:
    measuring a state of a measurement target at a first sampling rate and acquiring a first measurement value of the state of the measurement target;
    determining whether the first measurement value satisfies a first condition based on a first threshold value;
    before the first condition is satisfied, not transmitting the first measurement values and after the first condition is satisfied, transmitting the first measurement values acquired before the first condition is satisfied:
    switching the first sampling rate to a second sampling rate higher than the first sampling rate when the first condition is satisfied;
    measuring a state of the measurement target at the second sampling rate, and acquiring a second measurement value of the state of the measurement target; and
    transmitting the second measurement value.

7. A data reception device, comprising
    a wireless receiver configured to receive a plurality of measurement values associated with times;
    a determiner configured to determine whether each of the plurality of measurement values satisfies a first condition based on a first threshold value in order of temporally earlier measurement values; and
    a data interpolator configured to
        identify a measurement value satisfying the first condition from the plurality of measurements values wherein the measurement values associated with times before the time of the identified measurement value correspond to first measurement values and the measurement values associated with times after or on the time of the identified measurement value correspond to second measurement values,
        perform interpolation processing on the first measurement values to obtain interpolation processed data including the first measurement values and interpolated values, and
        generate time-series data including the interpolation processed data and the second measurement values.

* * * * *